United States Patent [19]

Palm et al.

[11] Patent Number: 5,776,353
[45] Date of Patent: Jul. 7, 1998

[54] ADVANCED COMPOSITE FILTRATION MEDIA

[75] Inventors: Scott K. Palm, Santa Maria; Timothy R. Smith, Lompoc; Jerome C. Shiuh, Lompoc; John S. Roulston, Lompoc, all of Calif.

[73] Assignee: Advanced Minerals Corporation, Santa Barbara, Calif.

[21] Appl. No.: 602,583

[22] Filed: Feb. 16, 1996

[51] Int. Cl.$^6$ .......................... H01D 37/02; H01D 39/00
[52] U.S. Cl. ............... 210/777; 210/500.1; 210/500.25; 210/500.26; 210/510.1; 210/503; 210/502.1; 210/490
[58] Field of Search ................ 210/502.1, 500.25, 210/500.26, 500.1, 503, 510.1, 490, 500.27, 767, 777

[56] References Cited

U.S. PATENT DOCUMENTS

| | | | |
|---|---|---|---|
| 3,864,124 | 2/1975 | Breton et al. | 264/59 |
| 4,059,423 | 11/1977 | DeVos et al. | 106/25 |
| 4,095,986 | 6/1978 | Matsuda et al. | 106/99 |
| 4,175,198 | 11/1979 | Saunders | 428/402 |
| 4,430,108 | 2/1984 | Hojaji et al. | 428/446 |
| 4,798,615 | 1/1989 | Fukuta et al. | 210/500.26 |
| 4,859,340 | 8/1989 | Hou et al. | 210/502.1 |
| 5,232,595 | 8/1993 | Meyer | 210/493.1 |
| 5,248,425 | 9/1993 | Wu | 210/500.26 |
| 5,389,166 | 2/1995 | White | 210/502.1 |
| 5,538,634 | 7/1996 | Pfiffner et al. | 210/502.1 |
| 5,540,834 | 7/1996 | Carr et al. | 210/502.1 |
| 5,582,892 | 12/1996 | Anderson | 210/502.1 |

FOREIGN PATENT DOCUMENTS

| | | | |
|---|---|---|---|
| 0248748 | 12/1987 | European Pat. Off. | 210/500.25 |
| 61-205619 | 9/1986 | Japan | 210/500.25 |
| 02-265631 | 10/1990 | Japan | 210/500.25 |

*Primary Examiner*—Ana Fortuna
*Attorney, Agent, or Firm*—Morrison & Foerster LLP

[57] ABSTRACT

This invention relates to advanced composite filtration media comprising (i) a functional filtration component and (ii) a matrix component, wherein said matrix component has a softening point temperature less than the softening point temperature of said functional filtration component, and wherein said functional filtration component is intimately bound to said matrix component; and methods for preparing and using same. More particularly, this invention pertains to advanced composite filter media and advanced composite filter media products comprised of a functional filtration component, such as a biogenic silica product (e.g., diatomite) or a natural glass product (e.g., expanded perlite) which bears a distinguishing porous and intricate structure suitable for filtration, which is thermally sintered to a matrix component, such as an engineering polymer (e.g., glasses, crystalline minerals, thermoplastics, and metals) that has a softening temperature below that of the functional filtration component. The advanced composite filtration media of the present invention offer unique properties such as increased permeability, low centrifuged wet density, low cristobalite content, and uniquely shaped particles (e.g., fibers).

56 Claims, No Drawings

5,776,353

1

ADVANCED COMPOSITE FILTRATION MEDIA

TECHNICAL FIELD

This invention relates to advanced composite filtration media comprising a functional filtration component and a matrix component, and methods for preparing and using same. More particularly, this invention pertains to advanced composite filter media and advanced composite filter media products comprised of a functional filtration component, such as a biogenic silica product (e.g., diatomite) or a natural glass product (e.g., expanded perlite) which bears a distinguishing porous and intricate structure suitable for filtration, which is thermally sintered to a matrix component, such as an engineering polymer (e.g., glasses, crystalline minerals, thermoplastics, and metals) that has a softening temperature below that of the functional filtration component.

DESCRIPTION OF THE RELATED ART

Throughout this application, various publications, patents, and published patent applications are referred to by an identifying citation; full citations for these documents may be found at the end of the specification immediately preceding the claims. The disclosures of the publications, patents, and published patent specifications referenced in this application are hereby incorporated by reference into the present disclosure to more fully describe the state of the art to which this invention pertains.

The present invention relates to advanced composite filtration media comprising (i) a functional filtration component and (ii) a matrix component, wherein said matrix component has a softening point temperature less than the softening point temperature of said functional filtration component, and wherein said functional filtration component is intimately bound to said matrix component. Unlike simple mixtures, which tend to segregate upon suspension (e.g., in fluids) or conveyance or transport, the functional filtration components and matrix components of the advanced composite filtration media of the present invention are intimately bound, as achieved, for example, by thermal sintering.

The advanced composite filtration media of the present invention are useful in many of the same applications as currently available filtration media, but offer one or more unique properties such as, for example, increased permeability, low centrifuged wet density, low cristobalite content, and/or uniquely shaped particles (e.g., fibers), as well as improved efficiency and/or economy, which are particularly valuable for filtration applications.

In the field of filtration, many methods of particle separation from fluids employ diatomite products or natural glass products as filter aids. The intricate and porous structures unique to these siliceous materials is particularly effective for the physical entrapment of particles, for example, in filtration processes. These intricate and porous structures create networks of void spaces that result in buoyant filtration media particles that have apparent densities similar to those of the fluids in which they are suspended. It is common practice to employ filtration products when improving the clarity of fluids that contain suspended particles or particulate matter, or have turbidity.

Diatomite or natural glass products are often applied to a septum to improve clarity and increase flow rate in filtration processes, in a step sometimes referred to as "precoating." Diatomite or natural glass products are also often added directly to a fluid as it is being filtered to reduce the loading

2 of undesirable particulate at the septum while maintaining a designed liquid flow rate, in a step often referred to as "body feeding." Depending on the particular separation involved, diatomite or natural glass products may be used in precoating, body feeding, or both. The working principles involved with porous media filtration have been developed over many years (Carman, 1937; Heertjes, 1949, 1966; Ruth, 1949; Sperry, 1916; Tiller, 1953, 1962, 1964), and have been recently reviewed in detail from both practical perspectives (Cain, 1984; Kiefer, 1991) as well as from their underlying theoretical principles (Bear, 1988; Nordén, 1994).

In certain circumstances, diatomite or natural glass products may also exhibit unique adsorptive properties during filtration that can greatly enhance clarification or purification of a fluid. These adsorptive properties are highly specific, and depend upon weak forces for attraction of the adsorbed species to weak electrical charges at the surface of diatomite, or upon the reactivity of silanol (i.e., $\equiv$Si—OH) functional groups that often occur at the diatomite surface. For example, an ionized silanol group (i.e., $\equiv$Si—O$^-$) may react with a hydronium ion (i.e., $H_3O^+$) contributed by an acidic substance in solution, for example, citric acid (i.e., $C_6H_8O_7$), adsorbing the donated $H^+$ at the surface in the process. In certain circumstances, perlite products, especially those which are surface treated, may also exhibit unique properties during filtration that can greatly enhance clarification or purification of a fluid (Ostreicher, 1986).

In some filtration applications, different diatomite products may be blended together, or different natural glass products may be blended together, to further modify or optimize the filtration process. Alternatively, diatomite products and natural glass products may sometimes be blended with each other, or with other substances. In some cases, these combinations may involve simple mixtures, for example, with cellulose, activated charcoal, clay, asbestos, or other materials. In other cases, these combinations are more elaborate mixtures in which diatomite products or natural glass products are intimately blended with other ingredients to make sheets, pads, cartridges, or monolithic or aggregate media used as supports, substrates, or in the preparation of catalysts.

Still more elaborate modifications of any of these diatomite or natural glass products are used for filtration or separation, involving, for example surface treatment or the absorption of chemicals to diatomite or natural glass products, mixtures, or their combinations.

The intricate and porous structure of silica unique to diatomite and natural glass products also permits their commercial use to provide antiblock properties to polymers. Diatomite products are often used to alter the appearance or properties of paints, enamels, lacquers, and related coatings and finishes. Diatomite products are also used as chromatographic supports, and are especially suited to gas-liquid chromatographic methods. Recent reviews (Breese, 1994; Engh, 1994) provide particularly useful introductions to the properties and uses of diatomite. Many natural glass products, including, for example, expanded perlite, pumice, and expanded pumice, also possess unique filler properties. For example, expanded perlite products are often used as insulating fillers, resin fillers, and in the manufacture of textured coatings.

The method of preparing monolithic or aggregate media is distinguished from that of preparing advanced composite filtration media by the fact that components added for monolithic or aggregate media are added prior to thermal treatment as processing aids (e.g., clay) usually prior to thermal treatment to provide green strength to the unfired mixture (e.g., to enable the extruding, forming, molding, casting, or shaping of green mixtures), rather than added as desired functional components of an advanced composite filtration media. The addition of processing aids does not otherwise favorably contribute to the filtration characteristics of resulting monolithic or aggregate media products, but these products are nevertheless useful for immobilization of proteins, enzymes, and microorganisms. The intent of thermal treatment (i.e., firing) in the processing of technical ceramics from a physical mixture of discrete particulate phases is to produce a dense homogeneous ceramic material (Reynolds, 1979), unlike the sintered heterogeneous components of the advanced composite filtration media of the present invention.

SUMMARY OF THE INVENTION

One aspect of the present invention pertains to advanced composite filtration media comprising (i) a functional filtration component and (ii) a matrix component, wherein said matrix component has a softening point temperature less than the softening point temperature of said functional filtration component, and wherein said functional filtration component is intimately bound to said matrix component.

In a preferred embodiment, the advanced composite filtration media has a permeability greater than the permeability of a simple mixture of said functional filtration component and said matrix component (more preferably greater by 5% or more), wherein the proportions of said functional filtration component and said matrix component in said simple mixture are identical to those used in the preparation of said media.

In another preferred embodiment, the advanced composite filtration media has a median particle diameter greater than the weighted average of the median particle diameter of said functional filtration component and the median particle diameter of said matrix component (more preferably greater by 5% or more), wherein the proportions of said functional filtration component and said matrix component are identical to those used in the preparation of said media.

In another preferred embodiment, the functional filtration component is selected from the group consisting of biogenic silica and natural glass; more preferably from the group consisting of diatomite, perlite, pumice, obsidian, pitchstone, and volcanic ash; still more preferably from the group consisting of diatomite, perlite, and volcanic ash; most preferably diatomite.

In another preferred embodiment, the matrix component is selected from the group consisting of glasses, crystalline minerals, thermoplastics, and metals. In another preferred embodiment the matrix component is a natural glass, more preferably selected from the group consisting of perlite, pumice, obsidian, pitchstone, and volcanic ash, most preferably perlite or fluxed perlite. In another preferred embodiment the matrix component is a synthetic glass. In another preferred embodiment the matrix component is a fiber glass. In another preferred embodiment the matrix component is mineral wool or rock wool. In another preferred embodiment the matrix component is a thermoplastic or a thermoset polymer with thermoplastic behavior. In another preferred embodiment the matrix component is a metal or a metal alloy.

In another preferred embodiment, the advanced composite filtration media is further characterized by a cristobalite content of 1% or less by weight.

Another aspect of the present invention pertains to compositions comprising an advanced composite filtration media, said media comprising (i) a functional filtration component and (ii) a matrix component, wherein said matrix component has a softening point temperature less than the softening point temperature of said functional filtration component, and wherein said functional filtration component is intimately bound to said matrix component. In a preferred embodiment, the composition is in the form of a powder. In another preferred embodiment, the composition is in the form of a sheet, pad, or cartridge. In another preferred embodiment, the composition is in the form of a monolithic support or an aggregate support. In another preferred embodiment, the composition is in the form of a monolithic substrate or an aggregate substrate.

Yet another aspect of the present invention pertains to methods of filtration comprising the step of passing a fluid containing suspended particulates through a filter aid material supported on a septum, wherein said filter aid material comprises an advanced composite filtration media, said media comprising (i) a functional filtration component and (ii) a matrix component, wherein said matrix component has a softening point temperature less than the softening point temperature of said functional filtration component, and wherein said functional filtration component is intimately bound to said matrix component.

DESCRIPTION OF THE PREFERRED EMBODIMENTS

A. Advanced Composite Filtration Media of the Present Invention

The advanced composite filtration media of the present invention comprise (i) a functional filtration component and (ii) a matrix component, wherein said matrix component has a softening point temperature less than the softening point temperature of said functional filtration component, and wherein said functional filtration component is intimately bound to said matrix component.

Many methods for the separation of particles from fluids employ siliceous media materials, such as diatomite, perlite, pumice, or volcanic ash, as filtration media. The intricate porous structures unique to these siliceous media materials are particularly effective for the physical entrapment of particles in filtration processes; hence, they are useful as functional filtration components of the current invention. Dimensional stability and retention of mechanical properties through the course of thermal processing are characteristic features of engineering polymers and certain other materials which makes them useful as matrix components in the present invention. In the advanced composite filtration media of the present invention, matrix components are intimately bound to functional filtration components, preferably by thermal sintering, and are not merely mixed or blended together. Unlike the advanced composite filtration media of the present invention, such simple mixtures tend to segregate upon suspension (e.g., in fluids) or conveyance or transport. The term "simple mixture" is used herein in the conventional sense to mean mechanical mixtures or blends (e.g., which have not been subjected to thermal sintering).

The advanced composite filtration media of the present invention may conveniently be considered to be an agglomerate of the functional filtration component and matrix component. The term "agglomeration" is used herein in the conventional sense to refer to any method or effect in which particles are assembled into a coherent mass. One example of an agglomeration method is thermal sintering, wherein particles are caused to become a coherent mass (i.e., are intimately bound), and therefore an "agglomerate", by heating without melting. Note that, in thermal sintering, agglomeration does not proceed to the point of forming a homogeneous medium (e.g., a ceramic). Thus, in the advanced composite filtration media of the present invention, functional filtration components and matrix components are agglomerated and intimately bound, but retain those physical and chemical properties which are deemed to be desirable in the resulting product, and therefore enhance the overall properties of the resulting product.

The term "softening point temperature" is used herein in the conventional sense to refer to the temperature at which a substance begins to soften, and is usually associated with a decrease in hardness and viscosity. For many engineering polymers, a softening point is often recognized more specifically as the glass transition temperature, sometimes called the second-order transition temperature, which is the temperature at which wriggling of polymer chains occurs as the temperature is raised, i.e., the polymer changes from a rigid glassy state to a flexible solid. Polyether ketones, for example, have glass transition temperatures of about 330° F. (i.e., 165° C.), while soda-lime glasses have softening points of about 1290° F. (i.e., 700° C.). While standard test methods, which usually employ thermomechanical analysis, have been developed (e.g., American Society for Testing and Materials, 1995), the softening point can often be estimated visually in laboratory studies without employing sophisticated quantitative determinations.

1. Functional Filtration Components

An especially preferred functional filtration component for use in the present invention is derived from biogenic silica (i.e., silicon dioxide, $SiO_2$) which bears the distinguishing porous and intricate structure of silica unique to diatomite. Currently, diatomite products are used in a wide variety of applications, including, but not limited to, separation, adsorption, support, and functional filler applications.

Diatomite products are obtained from diatomaceous earth (also known as kieselguhr), which is a sediment enriched in the siliceous frustules, i.e., shells, of diatoms. Diatoms are a diverse array of microscopic, single-celled golden brown algae of the class Bacillariophyceae, in which the cytoplasm is contained within ornate siliceous frustules of varied and intricate structure. These frustules are sufficiently durable to retain much of their porous structure virtually intact through long periods of geologic time when preserved in conditions that maintain chemical equilibrium. Currently, diatomite products may be manufactured by a variety of methods and from numerous resources, offering diversity in physical and chemical characteristics. Recent reviews (Breese, 1994; Engh, 1994) provide particularly useful introductions to the properties and uses of diatomite.

In a typical conventional method of preparing commercial diatomite products, crude ores of diatomaceous earth are crushed to a size that can be further reduced by milling, air classified, and dried in a furnace in air with subsequent air classification to achieve a desired product permeability, thus forming a dried product, commonly referred to as "natural" diatomite.

In another conventional method, a natural product can be sintered in air (commonly called calcining) at temperatures typically ranging from 1800° to 2000° F. (i.e., 1000° to 1100° C.), followed by air classification. This method achieves more permeable products, but is usually accompanied by partial conversion of amorphous silica (the natural phase of silica of diatomaceous earth ores) to cristobalite, which is a tetragonal form of crystalline silica. Products made by this method typically have cristobalite contents ranging from 5 to 40% by weight.

In another conventional method, a dried product can also be further sintered in air with the addition of a small quantity of flux (commonly called flux calcining) at temperatures typically ranging from 1800° to 2100° F. (i.e., 1000° to 1150° C.), followed by air classification. This method achieves still more permeable products, but usually with even greater conversion of amorphous silica to cristobalite, which is typically present in the range of 20 to 75% by weight. The most commonly used fluxes include soda ash (i.e., sodium carbonate, $Na_2CO_3$) and rock salt i.e., sodium chloride, NaCl), although many other fluxes, particularly salts of the alkali metals i.e., Group IA of the periodic table) are useful.

The high temperatures involved in the conventional methods of sintering diatomite products usually result in reduced surface area, enlargement of pores, increased wet density, and changes in impurity solubility, in addition to the expected silica phase change from the amorphous state to cristobalite.

Other methods have been described in detail for processing diatomite and preparing products made from diatomite. Much effort to improve low grade diatomaceous earths into higher grade ores has resulted in diatomite products essentially equivalent in their overall quality to commercial products obtained from naturally better ores. Examples of such work includes that of Norman and Ralston (1940), Bartuska and Kalina (1968a, 1968b), Visman and Picard (1972), Tarhanic and Kortisova (1979), Xiao (1987), Li (1989), Liang (1990), Zhong et al. (1991), Brozek et al. (1992), Wang (1992), Cai et al. (1992), and Videnov et al. (1993). Several diatomite products that have been prepared with a single property targeted for improvement, for example, reduced total iron or soluble iron concentration, have been reported by Thomson and Barr (1907), Barr (1907), Vereinigte (1913, 1928), Koech (1927), Swallen (1950), Suzuki and Tomizawa (1971), Bradley and McAdam (1979), Nielsen and Vogelsang (1979), Heyse and Feigl (1980), and Mitsui et al. (1989). A diatomite product made by Baly (1939) had low organic matter, and Codolini (1953), Pesce (1955, 1959), Martin and Goodbue (1968), and Munn (1970) made diatomite products with relatively high brightness. A diatomite product made by Enzinger (1901) reduced conventional solubility at that time. Diatomite products made by Bregar (1955), Gruder et al. (1958), and Nishamura (1958) were brighter, coupled with a lower total iron concentration. A product made by Smith (1991a,b,c; 1992a,b,c; 1993; 1994a,b) improved on the soluble multivalent cations of a flux calcined diatomite product. Schuetz (1935), Filho and Mariz da Veiga (1980), Marcus and Creanga (1965), and Marcus (1967) also reported methods for making somewhat purer diatomite products. Dufour (1990, 1993) describes a method for preparing diatomite products with low cristobalite content.

None of the aforementioned products of diatomite, however, comprise (i) a functional filtration component and (ii) a matrix component, wherein said matrix component has a softening point temperature less than the softening point temperature of said functional filtration component, and wherein said functional filtration component is intimately bound to said matrix component.

Other functional filtration components of particular usefulness are derived from natural glasses which also bear distinguishing porous and intricate structures that are particularly effective for the physical entrapment of particles in filtration processes. The term "natural glass" is used herein in the conventional sense and refers to natural glasses, commonly referred to as volcanic glasses, which are formed by the rapid cooling of siliceous magma or lava. Several types of natural glasses are known, including, for example, perlite, pumice, obsidian, and pitchstone. Prior to processing, perlite is generally gray to green in color with abundant spherical cracks which cause it to break into small pearl-like masses. Pumice is a very lightweight glassy vesicular rock. Obsidian is generally dark in color with a vitreous luster and a characteristic conchoidal fracture. Pitchstone has a waxy resinous luster and is frequently brown, green, or gray. Volcanic glasses such as perlite and pumice occur in massive deposits and find wide commercial use. Volcanic ash, often referred to as tuff when in consolidated form, consists of small particles or fragments which are often in glassy form; as used herein, the term natural glass encompasses volcanic ash.

Most natural glasses are chemically equivalent to rhyolite. Natural glasses which are chemically equivalent to trachyte, dacite, andesite, latite, and basalt are known but are less common. The term obsidian is generally applied to massive natural glasses that are rich in silica. Obsidian glasses may be classified into subcategories according to their silica content, with rhyolitic obsidians (containing typically about 73% $SiO_2$ by weight) as the most common (Berry, 1983).

Perlite is a hydrated natural glass containing typically about 72–75% $SiO_2$, 12–14% $Al_2O_3$, 0.5–2% $Fe_2O_3$, 3–5% $Na_2O$, 4–5% $K_2O$, 0.4–1.5% $CaO$ (by weight), and small concentrations of other metallic elements. Perlite is distinguished from other natural glasses by a higher content (2–5% by weight) of chemically bonded water, the presence of a vitreous, pearly luster, and characteristic concentric or arcurate onion skin-like (i.e., perlitic) fractures.

Perlite products are often prepared by milling and thermal expansion, and possess unique physical properties such as high porosity, low bulk density, and chemical inertness. Expanded perlite has been used in filtration applications since about the late 1940's (Breese and Barker, 1994). Conventional processing of perlite consists of comminution (crushing and grinding), air size classification, thermal expansion, and air size classification of the expanded material to meet the specifications of the finished product. For example, perlite ore is crushed, ground, and classified to a predetermined particle size range (e.g., passing 30 mesh), then classified material is heated in air at a temperature of 870°–1100° C. in an expansion furnace, where the simultaneous softening of the glass and vaporization of contained water leads to rapid expansion of glass particles to form a frothy glass material with a bulk volume up to 20 times greater than that of the unexpanded ore. Often, the expanded perlite is then air classified and optionally milled to meet the size specification of a desired product. The presence of chemically bonded water in other natural glasses (for example, pumice, obsidian, and volcanic ash) often permits "thermal expansion" in a manner analogous to that commonly used for perlite.

Pumice is a natural glass characterized by a mesoporous structure (e.g., having pores or vesicles with a size up to about 1 mm). The highly porous nature of pumice gives it a very low apparent density, in many cases allowing it to float on the surface of water. Most commercial pumice contains from about 60 to about 70% $SiO_2$ by weight. Pumice is typically processed by milling and classification (as described above for perlite), and products are primarily used as lightweight aggregates and also as abrasives, absorbents, and fillers. Unexpanded pumice and thermally expanded pumice (prepared in a manner analogous to that used for perlite) may also be used as filter aids in some cases (Geitgey, 1979), as can volcanic ash (Kansas Minerals, Inc., undated).

Modifications of methods and products for natural glasses have been reported. For example, Houston (1959), Bradley (1979), Jung (1963), Morisaki (1976), Ruff and Nath (1982), and Shiuh (1982, 1985) describe methods for treatment that result in specialized natural glass products.

None of the aforementioned products of natural glass, however, comprise (i) a functional filtration component and (ii) a matrix component, wherein said matrix component has a softening point temperature less than the softening point temperature of said functional filtration component, and wherein said functional filtration component is intimately bound to said matrix component.

2. Matrix Components

Matrix components which are suitable for use in the preparation of the advanced composite filtration media of the present invention are characterized by having a softening point temperature which is lower than the softening point temperature of the selected functional filtration component.

Examples of preferred matrix components include engineering polymers and related materials, which may be organic or inorganic polymers derived from natural sources or produced synthetically. An excellent review of engineering polymers has been prepared by Seymour (1990). Examples of particularly preferred matrix components include glasses, crystalline minerals, thermoplastics, and metals.

Glasses are vitreous amorphous polymers consisting of repeating siloxane (i.e., —(Si—O)—) units in the polymer chain. As described above, some glasses are naturally occurring, such as perlite, pumice, obsidian, pitchstone, and volcanic ash. Others, such as soda-lime glasses, are produced synthetically. Soda-lime glass is made by melting batches of raw materials containing the oxides of silicon (i.e., $SiO_2$), aluminum (i.e., $Al_2O_3$), calcium (i.e., $CaO$), sodium (i.e., $Na_2O$), and sometimes potassium (i.e., $K_2O$), or lithium (i.e., $Li_2O$) together in a furnace, and then allowing the melt to cool so as to produce the amorphous product. Glasses may be made in a wide variety of shapes, including sheets or plates, cast shapes, or fibers. Methods of manufacturing the principal families of glasses have been reported (Scholes, 1974). Mineral wools, rock wools, and silicate cottons are generic names for manufactured fibers in which the fiber-forming substances may be slag, certain rocks, or glass (Kujawa, 1983).

Certain crystalline minerals, particularly silicate minerals and aluminosilicate minerals, and the rocks composed of mixtures of them, are useful matrix components of the present invention, because they often possess desirable thermoplastic characteristics (e.g., because they have chemistries related to those of many silicate glasses). Examples of such crystalline minerals include nepheline (a potassium sodium aluminum silicate, i.e., $(Na,K)AlSiO_4$), albite (a sodium aluminum silicate, i.e., $NaAlSi_3O_8$), or calcium albite (a sodium calcium aluminum silicate, i.e., $(Na,Ca)(Si,Al)_4O_8$).

Thermoplastic materials are those which soften under the action of heat and harden again to their original characteristics on cooling, that is, the heating-cooling cycle is fully reversible. By conventional definition, thermoplastics are straight and branched linear chain organic polymers with a molecular bond. Examples of well-known thermoplastics include products of acrylonitrile butadiene styrene (ABS), styrene acrylonitrile (SAN), acrylate styrene acrylonitrile (ASA), methacrylate butadiene styrene (MBS). Also included are polymers of formaldehyde, known as acetals; polymers of methyl methacrylate, known as acrylic plastics; polymers of monomeric styrene, known as polystyrenes; polymers of fluorinated monomers, known as fluorocarbons; polymers of amide chains, known as nylons; polymers of paraffins and olefins, known as polyethylenes, polypropylenes, and polyolefins; polymers composed of repeating bisphenol and carbonate groups, known as polycarbonates; polymers of terephthalates, known as polyesters; polymers of bisphenol and dicarboxylic acids, known as polyarylates; and polymers of vinyl chlorides, known as polyvinyl chlorides (PVC). High performance thermoplastics have extraordinary properties, for example, polyphenylene sulfide (PPS), which has exceptionally high strength and rigidity; polyether ketone (PEK), polyether ether ketone (PEEK), polyamide imide (PAI), which have very high strength and rigidity, as well as exceptional heat resistance; and polyetherimide (PEI), which has inherent flame resistance. Unusual thermoplastics include ionomers, i.e., copolymers of ethylene and methacrylic acid that have ionic rather than covalent crosslinking which results in behavior resembling that of thermoset plastics in their operating range; polyvinylcarbazole, which has unique electrical properties; and polymers of isobutylene, known as polyisobutylenes, which are viscous at room temperature.

Thermoset plastics are synthetic resins that are permanently changed upon thermal curing, that is, they solidify into an infusible state so that they do not soften and become plastic again upon subsequent heating. However, certain thermoset plastics may exhibit thermoplastic behavior over a limited portion of their useful application ranges, and are similarly useful as matrix components of the present invention. Some types of thermoset plastics, especially certain polyesters and epoxides, are capable of cold curing at room temperature. Thermoset plastics include alkyds, phenolics, epoxides, aminos (including urea-formaldehyde and melamine-formaldehyde), polyimides, and some silicon plastics.

The properties and applications of thermoplastics and thermoset plastics have been described in detail (Elsevier, 1992; Rubin, 1990).

Certain metals and metal alloys are useful matrix components, particularly low melting temperature metals and alloys, in that they possess thermoplastic characteristics useful in the present invention. Examples of suitable metals are tin (i.e., Sn), zinc (i.e., Zn) and lead (i.e., Pb). Examples of suitable metal alloys are solders such as tin-lead solder (i.e., Sn—Pb), tin-zinc solder (i.e., Sn—Zn), and zinc-lead solder (i.e., Zn—Pb).

Other materials with similar thermoplastic characteristics and which are characterized by a softening point temperature that is lower than the softening point temperature of the selected functional filtration component may also be useful as matrix components in the present invention.

B. Methods for Characterizing the Advanced Composite Filtration Media of the Present Invention The advanced composite filtration media of the present invention possess unique properties, as they are comprised of both a functional filtration component as well as a matrix component. These media retain the intricate and porous structure that is characteristic of the functional filtration component (which is essential in many applications for the advanced composite filtration media product to be effective) as evidenced by the media having suitable permeability in ranges useful to filtration. The advanced composite filtration media, however, are modified by the presence of a matrix component. These modifications are illustrated by unique properties such as increased permeability, low centrifuged wet density, low cristobalite content, and/or changes in microstructural characteristics.

Important properties of the advanced composite filtration media of the present invention, and suitable methods for their determination, are described in detail below.

1. Permeability

Functional filtration products are usually processed to provide a range of filtration rates, which are closely related to their permeability, P. Permeability is often reported in units of darcies, commonly abbreviated "Da."; 1 darcy corresponds to the permeability through a filter media 1 cm thick which allows 1 $cm^3$ of fluid with a viscosity of 1 centipoise to pass through an area of 1 $cm^2$ in 1 sec under a pressure differential of 1 atm (i.e., 101.325 kPa). Permeability is readily determined (European Brewery Convention, 1987) using a specially constructed device designed to form a filter cake on a septum from a suspension of filtration media in water, and then measuring the time required for a specified volume of water to flow through a measured thickness of filter cake of known cross-sectional area. The principles have been previously derived for porous media from Darcy's law (Bear, 1972), and so an array of alternative devices and methods are in existence that correlate well with permeability. Filtration media, such as diatomite and natural glass products that are currently commercially available (and which are also suitable for use as functional filtration components of the present invention) span a wide range of permeability, from less than 0.05 Da to over 30 Da. The selection of the filtration permeability for a specific filtration process depends on the flow rate and degree of fluid clarification desired for the particular application.

The advanced composite filtration media of the present invention offer a spectrum of permeabilities comparable to the range offered by their commercial functional filtration components.

Evidence of agglomeration and thus the formation of the advanced composite filtration media (i.e., wherein the functional filtration component and the matrix component are intimately bound) may generally be provided by observing a larger permeability for the advanced composite filtration media (after thermal sintering and unmilled, i.e., without further attrition or classification) than for the simple mixture of its components (i.e., prior to thermal sintering).

For example, if a simple mixture of a functional filtration component and a matrix component (having permeabilities of 0.06 Da and 0.29 Da, respectively) has a permeability, P(a+b), of 0.07 Da, and the advanced composite filtration media prepared from this simple mixture has a permeability, P(c), of 0.20 Da, then the increase in permeability is evidence of agglomeration. Preferably, P(c) is greater than P(a+b) by 5% or more, more preferably 10% or more, yet more preferably 20% or more.

2. Wet Density

An indicator of the degree to which the advanced composite filtration media product of the current invention retains the porous and intricate structure of its functional filtration media component may be obtained by measuring its centrifuged wet density, which represents its useful packed density in filtration, since the magnitude of the density is limited by the packing arrangement that can be achieved. Wet density is critical because it reflects the void volume available to entrain particulate matter in a filtration process; it is one of the most important criteria to determine the filtration efficiency. Filtration products with lower wet densities have greater void volumes, and thus greater filtration efficiency.

The preferred method for determining the packed density of the advanced composite filtration media products of the present invention is by measurement of the centrifuged wet density. A sample of known weight between 0.50 and 1.00 g is placed in a calibrated 14 mL centrifuge tube, to which deionized water is added to make up a volume of approximately 10 mL. The mixture is shaken thoroughly until all of the sample is wetted and there is no dry powder remaining. Additional deionized water is added around the top of the centrifuge tube to rinse down any mixture adhering to the side of the tube from shaking. The tube is centrifuged for 30 min at 1800 rpm. Following centrifugation, the tube is carefully removed so as not to disturb the solids, and the level (i.e., volume) of the settled matter is measured to the nearest half of a 0.05 mL graduation on the tube. The centrifuged wet density of the known weight of powder is readily calculated by dividing the dry sample weight (e.g., dried at 110° C. in air to constant weight) by the measured volume.

Typical wet densities for common filtration media range from as low as about 12 pounds per cubic foot (i.e., 0.19 g/cm$^3$) to as high as about 30 pounds per cubic foot (i.e., 0.48 g/cm$^3$). The advanced composite filtration media of the present invention offer a spectrum of wet densities comparable to the range offered by their commercial functional filtration components.

3. Particle Size

An important characteristic of the advanced composite filtration media of the present invention relates to agglomeration of the component particles, preferably through thermal sintering. One method for quantifying the degree of agglomeration involves determining the difference in particle size distribution between the components (i.e., before agglomeration) and the resulting advanced composite filtration media.

The preferred method for determining particle size distribution employs laser diffraction. The preferred instrument for determining the particle size distribution of the advanced composite filtration media, or its components, is a Leeds & Northrup Microtrac Model X-100. The instrument is fully automated, and the results are obtained using a volume distribution formatted in geometric progression of 100 channels, running for 30 seconds with the filter on. The distribution is characterized using an algorithm to interpret data from the diffraction pattern which assumes the particles have spherical shape characterized by a diameter, D. A median particle diameter is identified by the instrument as $D_{50}$, that is, 50% of the total particle volume is accounted for by particles having a diameter equal to or less than this value.

Evidence of agglomeration and thus the formation of the advanced composite filtration media (i.e., wherein the functional filtration component and the matrix component are intimately bound) may be provided by calculating the weighted average of the median particle diameter of the simple mixture of the functional filtration component and the matrix component (i.e., prior to thermal sintering) and the median particle diameter of the advanced composite filtration media prepared using that mixture (after thermal sintering and unmilled, i.e., without further attrition or classification).

For example, agglomeration has occurred when the weighted average, $D_{50}(a+b)$, of the median particle diameter of the functional filtration component, $D_{50}(a)$, and the median particle diameter of the matrix component, $D_{50}(b)$, is less than the median particle diameter of the advanced composite filtration media, $D_{50}(c)$. For example, if $D_{50}(a)$ is equal to 16.7 μm and comprises 70% by weight of the advanced composite filtration media, and if $D_{50}(b)$ is equal to 17.3 μm and comprises 30% by weight of the advanced composite filtration media, then, $$D_{50}(a+b) = |(0.70 \times 16.7) + (0.30 \times 17.3)|$$
$$= 16.9 \,\mu m$$

If the actual measured median particle diameter of the advanced composite filtration media, $D_{50}(c)$, is equal to 17.1 μm, then agglomeration has occurred, since $D_{50}(a+b)$ is less than $D_{50}(c)$. Preferably, $D_{50}(c)$ is greater than $D_{50}(a+b)$ by 1% or more, more preferably 5% or more, still more preferably 10% or more, yet more preferably 20% or more.

The application of the particle size method is most appropriate when particles of the functional filtration component, the matrix component, and the advanced composite filtration media all have approximately equal densities and approximate the spherical shape of particles assumed by the algorithm. For matrix components that are fibrous in nature, the more general permeability method is preferred.

4. Cristobalite Concentration

Some advanced composite filtration media are unique in that the cristobalite content is very low compared with commercial diatomite products of comparable permeability. The preferred method for determining cristobalite content is by quantitative x-ray diffraction according to the principles outlined by Klug and Alexander (1974). A sample is milled in a mortar and pestle to a fine powder, then back-loaded into an aluminum holder. The sample and its holder are placed into the beam path of an x-ray diffraction system and exposed to collimated x-rays using an accelerating voltage of 40 kV and a current of 20 mA focused on a copper target. Diffraction data are acquired by step-scanning over the angular region representing the interplanar spacing within the crystalline lattice structure of cristobalite that yields the greatest diffracted intensity. This area lies between 21 to 23 2θ°, with data collected in 0.05 2θ° steps, counted for 20 seconds per step. The net integrated peak intensity is compared with those of standards of cristobalite prepared by the standard additions method in amorphous silica to determine the weight percent of the cristobalite phase in a sample.

Preferably, the cristobalite content of the advanced composite filtration media of the present invention is less than 1% (usually from about 1% to as low as the detection limit), more preferably less than 1.1% (usually from about 1.1% to as low as the detection limit), still more preferably less than 1.5% (usually from about 1.5% to as low as the detection limit), yet more preferably less than 2% (usually from about 2% to as low as the detection limit), still more preferably less than 3% (usually from about 3% to as low as the detection limit), yet more preferably less than 5% (usually from about 5% to as low as the detection limit), still more preferably less than 10% (usually from about 10% to as low as the detection limit).

5. Microstructural Characteristics

The microstructural characteristics of the advanced composite filtration media are often different from those of the functional filtration component and matrix component prior to thermal sintering. Microscopic features of the advanced composite filtration media of the present invention are readily observed by preparing a suspension in a liquid of an appropriate refractive index (e.g., water) on glass slides and observing them under an optical microscope at magnifications of 200× and 400×. At these magnifications, the intricate and porous structures found in functional filtration components and the microscopic characteristics of the matrix components are clearly visible.

C. Methods for Preparing the Advanced Composite Filtration Media of the Present Invention A convenient method of preparing advanced composite filtration media of the present invention is by blending a functional filtration component with a matrix component, followed by application of heat to cause sintering and agglomeration to occur (i.e., thermal sintering).

The functional filtration component and matrix component may be mixed in any proportion, and the proportions employed are determined by the selected functional filtration component and matrix component and by the advanced composite filtration media sought. For example, at the matrix-poor end of the spectrum, the matrix component may typically comprise as little as 0.5 to 5% by weight (i.e., of the simple mixture comprising the functional filtration component and the matrix component, prior to thermal sintering), whereas, at the matrix-rich end of the spectrum, the matrix component may typically comprise as much as 70 to 90% by weight (i.e., of the simple mixture comprising the functional filtration component and the matrix component, prior to thermal sintering).

Blending of the functional filtration component with a matrix component, prior to heat treatment, may be readily accomplished using, for example, a mechanical mixer, for a suitable length of time to allow the components to become thoroughly mixed.

Heat may be applied using, for example, a conventional oven, microwave oven, infrared oven, muffle furnace, kiln, or a thermal reactor, in ambient atmospheres such as, for example, air, or artificial atmospheres such as, for example, nitrogen (i.e., $N_2$) or oxygen (i.e., $O_2$) at temperatures typically ranging from 100° to 2500° F. (i.e., 40° to 1400° C.) and at pressures ranging from 0.1 to 50 atm (i.e., 1 to 5000 kPa). Heat treatment parameters, such as temperature and duration, are determined by the selected functional filtration component and matrix component and by the advanced composite filtration media sought. For example, durations may range from about 1 ms (e.g., in fluidized bed reactors) to about 10 hours (e.g., in conventional furnaces). Suitable temperatures (i.e., to achieve thermal sintering) are typically at about the softening point temperature of the matrix component but below its melting point (i.e., not in the molten state).

Further modifications of the advanced composite filtration media of the present invention are also possible. For example, the advanced composite filtration media may be further processed to enhance one or more particular properties (for example, solubility or surface characteristics), or to yield a new product with a specialized use. Examples of such further modifications include, for example, acid washing, surface treatment, and organic derivatization.

1. Acid Washing

Another class of products may be prepared from the advanced composite filtration media described above by washing with an acidic substance, followed by rinsing with deionized water to remove residual acid, and subsequent drying. Acid washing of the advanced composite filtration media is beneficial in reducing the concentration of soluble contaminants, e.g., iron or aluminum. Suitable acids include mineral acids, for example, sulfuric acid (i.e., $H_2SO_4$), hydrochloric acid (i.e., HCl), phosphoric acid (i.e., $H_3PO_4$), or nitric acid (i.e., $HNO_3$), as well as organic acids, for example, citric acid (i.e., $C_6H_8O_7$) or acetic acid (i.e., $CH_3COOH$).

2. Surface Treatment

Another class of products can be prepared by treatment of the surface of advanced composite filtration media products described above, for example, by silanization, thereby modifying the product's surface such that it is rendered either more hydrophobic or more hydrophilic.

For example, the advanced composite filtration media may be placed in a plastic vessel, and a small quantity of dimethyldichlorosilane (i.e., $SiCl_2(CH_3)_2$) or hexamethyldisilazane (i.e., $(CH_3)_3Si-NH-Si(CH_3)_3$) is added to the vessel. Reaction is allowed to take place at the surface in the vapor phase over a 24 hr period, resulting in more hydrophobic products. Such products have application in compositions used in chromatography, and also when used in conjunction with other hydrophobic materials for improved mechanical performance, for example, in applications involving hydrocarbons and oils.

Similarly, the advanced composite filtration media can be reacted, for example, by suspending it in a solution containing 10% (w/v) aminopropyltriethoxysilane (i.e., $C_9H_{23}NO_3Si$) in water, refluxing at 700° C. for 3 hr, filtering the mixture, and drying the remaining solids to obtain more hydrophilic products. Such products have applications in compositions used in chromatography, when used in conjunction with aqueous systems for improved mechanical performance, and to permit further derivatization of the product, having converted terminal hydroxyl (i.e., —OH) functional groups of the advanced composite filtration media product surface to aminopropyl groups (i.e., —$(CH_2)_3NH_2$).

3. Organic Derivatization

The hydrophilic (e.g., silanized) modified advanced composite filtration media products can further be reacted to bind organic compounds, for example, a protein. The advanced composite filtration media may thereby serves as a support for the immobilization of organic compounds. So modified, the product has utility in applications such as affinity chromatography and biochemical purification.

A number of other reactions pertaining to derivatization of siliceous media products have been previously described (Hermanson, 1992). However, derivatization of the advanced composite filtration media of the present invention yields modified products with substantially superior efficacy as a result of the incorporation of a matrix component.

D. Methods of Using the Advanced Composite Filtration Media of the Present Invention The advanced composite filtration media products of the present invention, and their further modifications, are useful in the processing, treatment, or formulation of other materials.

In filtration applications, the advanced composite filtration media of the present invention, and their further modifications, may be applied to a septum to improve clarity and increase flow rate in filtration processes (e.g., precoating), or added directly to a fluid as it is being filtered to reduce the loading of undesirable particulate at the septum (e.g., body feeding).

The advanced composite filtration media of the present invention may be used in conjunction with other media (i.e., to form a filter aid composition) for filtration applications. For example, mixtures of the advanced composite filtration media with, for example, diatomite, perlite, natural glass, cellulose, activated charcoal, clay, or other materials are useful filter aid compositions. In other more elaborate combinations, advanced composite filtration media are blended with other ingredients to make sheets, pads, and cartridges.

The appropriate selection of which composition or modification of an advanced composite filtration media product is preferred is determined by the specific application. For example, in a filtration process that demands exceptional clarity but tolerates slower flow rate, an advanced composite filtration media product of low permeability is preferred, whereas in a filtration process that demands high flow rate but does not require exceptional clarity, an advanced composite filtration media product of high permeability is preferred. Similar reasoning applies to use of the advanced composite filtration media products when used in conjunction with other materials, or when preparing mixtures containing the product. The quantity of product which is used is similarly determined by the specific process to which it is applied.

The advanced composite filtration media of the present invention are also useful in non-filtration applications, such as functional fillers, for example. In paints and coatings, or in papers or polymers, this feature is usually accomplished by direct addition into the formulation at a concentration needed for the desired effect. Both the flatting property of the products in paints and coatings as well as the antiblock property of the products in polymers are derived from the unique surfaces provided by the advanced composite filtration media.

The silanized hydrophobic or hydrophilic products are desirable when these properties further improve the filtration or functional filler performance, owing to their greater compatibility with other materials or ingredients in a specific application. The alteration of surface characteristics through silanization is especially critical to chromatographic applications, as these characteristics strongly influence the effectiveness of chromatographic separations for specific systems. For example, hydrophobic surfaces on a chromatographic support reduce surface activity of the support and reduce tailing to a considerable degree when used for the analytical determination of pesticides.

The products are also desirable for further organic derivatizations, such as the coupling of a protein to an aminosilanized support. For example, protein A, a polypeptide derived from a bacterial source, can be coupled to an aminosilanized support prepared from the advanced composite filtration media.

In other applications, the advanced composite filtration media may be blended with other ingredients to make monolithic or aggregate media useful as supports (e.g., for microbe immobilization), substrates (e.g., for enzyme immobilization), or in the preparation of catalysts.

Many other modifications and variations of the invention as hereinbefore set forth can be made without departing from the spirit and scope thereof and therefore only such limitations should be imposed as are indicated by the appended claims.

E. EXAMPLES

Several advanced composite filtration media of the present invention, and methods for preparing them, are described in the following examples, which are offered by way of illustration and not by way of limitation.

Example 1
Diatomite (70%)+Perlite (30%)

In this example, an advanced composite filtration media was formulated by combining 70% by weight of a functional filtration component, CELITE 500, a natural diatomite with a permeability of 0.06 Da, a wet density of 17.0 pounds per cubic foot (i.e., 0.272 g/cm$^3$), and a median particle diameter, $D_{50}(a)$, of 16.7 μm (Celite Corporation, Lompoc, Calif.), and 30% by weight with a matrix component, HARBORLITE 200, a milled expanded perlite with a permeability of 0.29 Da, a wet density of 14.0 pounds per cubic foot (i.e., 0.224 g/cm$^3$), and a median particle diameter, $D_{50}(b)$, of 17.3 μm (Harborlite Corporation, Vicksburg, Mich.). The mixture was sintered in air in a muffle furnace at 1700° F. (i.e., 930° C.) for 45 min, then removed from the furnace and allowed to cool to room temperature, forming the advanced composite filtration media.

The advanced composite filtration media of this example had a permeability of 0.20 Da, a wet density of 14.5 pounds per cubic foot (i.e., 0.232 g/cm$^3$), a median particle diameter, $D_{50}(c)$, of 17.1 μm, and a cristobalite content of 0.1%.

By comparison, a simple mixture of the components of this example has a permeability of 0.07 Da, a wet density of 17.1 pounds per cubic foot (i.e., 0.274 g/cm$^3$), and a median particle diameter of 17.0 μm. Furthermore, commercial diatomite products of permeability comparable to that of the advanced composite filtration media of this example have a typical cristobalite content of about 20% and a wet density of about 19 pounds per cubic foot (i.e., 0.30 g/cm$^3$). Thus, the advanced composite filtration media of this example offers highly unique properties not offered by the individual media components or by commercial diatomite products of comparable permeability.

Example 2
Diatomite (90%)+Perlite (10%)+Acid Flux

In this example, an advanced composite filtration media was formulated by combining 90% by weight of a functional filtration component, CELITE 500, a natural diatomite with a permeability of 0.06 Da, a wet density of 17.0 pounds per cubic foot (i.e., 0.272 g/cm$^3$), and a median particle diameter, $D_{50}(a)$, of 16.7 μm (Celite Corporation, Lompoc, Calif.), 10% by weight with a matrix component, HARBORLITE 200, a milled expanded perlite with a permeability of 0.29 Da, a wet density of 14.0 pounds per cubic foot (i.e., 0.224 g/cm$^3$), and a median particle diameter, $D_{50}(b)$, of 17.3 μm (Harborlite Corporation, Vicksburg, Mich.), the mixture then combined with 2% boric acid (i.e., $H_3BO_3$) as an acid flux to reduce the softening temperature of perlite. The mixture was sintered in air in a muffle furnace at 1700° F. (i.e., 930° C.) for 30 min, then removed from the furnace and allowed to cool to room temperature, forming the advanced composite filtration media.

The advanced composite filtration media of this example had a permeability of 0.69 Da, a wet density of 13.0 pounds per cubic foot (i.e., 0.208 g/cm$^3$), a median particle diameter, $D_{50}(c)$, of 20.3 μm, and a cristobalite content of 0.5%.

By comparison, a simple mixture of the components of this example has a permeability of 0.06 Da, and a wet density of 17.3 pounds per cubic foot (i.e., 0.277 g/cm$^3$). Furthermore, commercial diatomite products of permeability comparable to that of the advanced composite filtration media of this example have a typical cristobalite content of about 40% and a wet density of about 19 pounds per cubic foot (i.e., 0.30 g/cm$^3$). Thus, the advanced composite filtration media of this example offers unique properties not offered by the individual media components or by commercial diatomite products of comparable permeability.

Example 3
Diatomite (50%)+Perlite (50%)+Acid Flux

In this example, an advanced composite filtration media was formulated by combining 50% by weight of a functional filtration component, CELITE 500, a natural diatomite with a permeability of 0.06 Da, a wet density of 17.0 pounds per cubic foot (i.e., 0.272 g/cm$^3$), and a median particle diameter, $D_{50}(a)$, of 16.7 μm (Celite Corporation, Lompoc, Calif.), 50% by weight with a matrix component, HARBORLITE 700, a milled expanded perlite with a permeability of 0.73 Da, a wet density of 14.5 pounds per cubic foot (i.e., 0.232 g/cm$^3$), and a median particle diameter, $D_{50}$(b), of 30.2 µm (Harborlite Corporation, Vicksburg, Mich.), the mixture then combined with 5% boric acid (i.e., $H_3BO_3$) as an acid flux to reduce the softening temperature of perlite. The mixture was sintered in air in a muffle furnace at 1700° F. (i.e., 930° C.) for 30 min, then removed from the furnace and allowed to cool to room temperature, forming the advanced composite filtration media.

The advanced composite filtration media of this example had a permeability of 1.9 Da, a wet density of 11.3 pounds per cubic foot (i.e., 0.181 g/cm$^3$), a median particle diameter, $D_{50}$(c), of 33.5 µm, and a cristobalite content of 0.1%.

By comparison, a simple mixture of the components of this example has a permeability of 0.10 Da, a wet density of 15.8 pounds per cubic foot (i.e., 0.253 g/cm$^3$), and a median particle diameter of 26.4 µm. Furthermore, commercial diatomite products of a permeability comparable to that of the advanced composite filtration media of this example have a typical cristobalite content of about 50% and a wet density of about 19 pounds per cubic foot (i.e., 0.30 g/cm$^3$). Thus, the advanced composite filtration media of this example offers unique properties not offered by the individual media components or by commercial diatomite products of comparable permeability.

Example 4
Diatomite (70%)+Basic Fluxed Perlite (30%)

In this example, an advanced composite filtration media was formulated by combining 70% by weight of a functional filtration component, CELITE 500, a natural diatomite with a permeability of 0.06 Da, a wet density of 17.0 pounds per cubic foot (i.e., 0.272 g/cm$^3$), and a median particle diameter, $D_{50}$(a), of 16.7 µm (Celite Corporation, Lompoc, Calif.), 30% by weight with a matrix component, HARBORLITE 700, a milled expanded perlite with a permeability of 0.73 Da, a wet density of 14.5 pounds per cubic foot (i.e., 0.232 g/cm$^3$), and a median particle diameter, $D_{50}$(b), of 30.2 µm (Harborlite Corporation, Vicksburg, Mich.), the latter component of which was preheated for 10 min at 1700° F. (i.e., 930° C.) with 2% soda ash (i.e., sodium carbonate, $Na_2CO_3$) as a basic flux to reduce the softening temperature of perlite. The mixture was then sintered in air in a muffle furnace at 1700° F. (i.e., 930° C.) for 30 min, and removed from the furnace and allowed to cool to room temperature, forming the advanced composite filtration media.

The advanced composite filtration media of this example had a permeability of 0.38 Da, a wet density of 14.5 pounds per cubic foot (i.e., 0.232 g/cm$^3$), a median particle diameter, $D_{50}$(c), of 24.8 µm, and a cristobalite content of 0.9%.

By comparison, a simple mixture of the components of this example has a permeability of 0.07 Da, a wet density of 16.4 pounds per cubic foot (i.e., 0.263 g/cm$^3$), and a median particle diameter of 24.2 µm. Furthermore, commercial diatomite products of permeability comparable to that of the advanced composite filtration media of this example have a typical cristobalite content of about 30% and a wet density of about 19 pounds per cubic foot (i.e., 0.30 g/cm$^3$). Thus, the advanced composite filtration media of this example offers unique properties not offered by the individual media components or by commercial diatomite products of comparable permeability.

Example 5
Diatomite (50%)+Polyether Ketone (50%)

In this example, an advanced composite filtration media was formulated by combining 50% by weight of a functional filtration component, CELITE 500, a natural diatomite with a permeability of 0.06 Da, a wet density of 17.0 pounds per cubic foot (i.e., 0.272 g/cm$^3$), and a median particle diameter, $D_{50}$(a), of 16.7 µm (Celite Corporation, Lompoc, Calif.), and 50% by weight with a matrix component, KADEL E1000C, a polyether ketone (Amoco Performance Products, Alpharetta, Ga.). The mixture was sintered in air in a muffle furnace at 400° F. (i.e., 200° C.) for 30 min, then removed from the furnace and allowed to cool to room temperature, forming the advanced composite filtration media.

The advanced composite filtration media of this example had a permeability of 0.13 Da, a wet density of 19.8 pounds per cubic foot (0.317 g/cm$^3$), a median particle diameter, $D_{50}$(c), of 61.1 µm, and a cristobalite content of less than 0.1%.

By comparison, a simple mixture of the components of this example has a permeability of 0.07 Da, a wet density of 23.1 pounds per cubic foot (i.e., 0.370 g/cm$^3$), and a median particle diameter of 31.3 µm. Because of the hydrophobic characteristics of polyether ketone alone, comparable measurements of permeability, wet density, and median particle diameter are not possible by the methods otherwise preferred. The product is unique in that the thermoplastic partly penetrates the pores of the functional filtration component, yet also results in agglomeration. Thus, the advanced composite filtration media of this example offers highly unique properties not offered by the individual media components.

Example 6
Diatomite (85%)+Rock Wool (15%)

In this example, an advanced composite filtration media was formulated by combining 85% by weight of a functional filtration component, CELITE 500, a natural diatomite with a permeability of 0.06 Da, a wet density of 17.0 pounds per cubic foot (i.e., 0.272 g/cm$^3$), and a median particle diameter, $D_{50}$(a), of 16.7 µm (Celite Corporation, Lompoc, Calif.), and 15% by weight with a matrix component, ground rock wool (USG Interiors, Inc., Chicago, Ill.) having brown, isotropic fibers 5 to 20 µm in diameter and 50 to 300 µm in length, with a wet density of 69.3 pounds per cubic foot (i.e., 1.11 g/cm$^3$). The mixture was sintered in air in a muffle furnace at 1700° F. (i.e., 930° C.) for 30 min, then removed from the furnace and allowed to cool to room temperature, forming the advanced composite filtration media.

The advanced composite filtration media of this example had a permeability of 0.25 Da, a wet density of 17.8 pounds per cubic foot (i.e., 0.285 g/cm$^3$), and less than 0.1% cristobalite.

By comparison, a simple mixture of the two components of this example has a permeability of 0.06 Da, a wet density of 19.5 pounds per cubic foot (i.e., 0.313 g/cm$^3$), and a median particle diameter of 17.6 µm. The product is unique in that the microstructural features of the rock wool are retained. Thus, the advanced composite filtration media of this example offers highly unique properties not offered by the individual media components.

Example 7
Diatomite (95%)+Fiber Glass (5%)

In this example, an advanced composite filtration media was formulated by combining 95% by weight of a functional filtration component, CELITE 500, a natural diatomite with a permeability of 0.06 Da, a wet density of 17.0 pounds per cubic foot (i.e., 0.272 g/cm$^3$), and a median particle diameter, $D_{50}$(a), of 16.7 µm (Celite Corporation, Lompoc, Calif.), and 5% by weight with a matrix component, insulation fiber glass (Owens-Corning Fiberglass, Toledo, Ohio)

having colorless fibers about 5 µm in diameter and 300 to 700 µm in length. The mixture was sintered in air in a muffle furnace and allowed to cool to room temperature, forming the advanced composition filtration media.

The advanced composite filtration media of this example had a permeability of 0.09 Da, a wet density of 16.0 pounds per cubic foot (i.e., 0.256 g/cm$^3$), and 0.1% cristobalite.

The product is unique in that the microstructural features of the fiberglass are retained. Thus, the advanced composite filtration media of this example offers highly unique properties not offered by the individual media components.

Example 8
Diatomite (80%)+Tin (20%)

In this example, an advanced composite filtration media was formulated by combining 80% by weight of a functional filtration component, CELITE 500, a natural diatomite with a permeability of 0.06 Da, a wet density of 17.0 pounds per cubic foot (i.e., 0.272 g/cm$^3$), and a median particle diameter, $D_{50}(a)$, of 16.7 µm (Celite Corporation, Lompoc, Calif.), and 20% by weight with a matrix component, tin powder (Johnson-Matthey, Ward Hill, Mass.) of less than 100 mesh and of 99.5% purity. The mixture was sintered in air in a muffle furnace at 220° C. for 30 min, then removed from the furnace and allowed to cool to room temperature, forming the advanced composite filtration media.

The advanced composite filtration media of this example had a permeability of 0.06 Da, a wet density of 20.8 pounds per cubic foot (i.e., 0.333 g/cm$^3$), and 0.3% cristobalite.

The product is unique in that microstructural analysis reveals small opaque particles, spherical, ellipsoidal, or angular in shape, with a metallic sheen, such that features of tine are retained. Thus, the advanced composite filtration media of this example offers highly unique properties not offered by the individual media components.

F. REFERENCES

The disclosures of the publications, patents, and published patent specifications referenced below are hereby incorporated by reference into the present disclosure to more fully describe the state of the art to which this invention pertains.

Baly, E. C. C. et al. (1939), *Trans. Faraday Soc.*, Vol. 35, pp. 1165–1175.
Barr, J. (1907), French Patent 377,086.
Bartuska, M. and Kalina, J. (1968a), Czech. Patent 128,699.
Bartuska, M. and Kalina, J. (1968b), Czech. Patent 128,894.
Bear, J. (1988), *Dynamics of Fluids in Porous Media* (New York: Dover Publications, Inc.), pp. 161–176.
Berry, L. G. et al. (1983), *Mineralogy*, 2nd ed. (New York: Freeman and Co.), pp. 540–542.
Bradley, T. G. and McAdam, R. L. (1979), U.S. Pat. No. 4,134,857.
Breese, R. (1994), in *Industrial Minerals and Rocks*, 6th ed., (Littleton, Colo.: Society for Mining, Metallurgy, and Exploration); pp. 397–412.
Breese, R. and Barker, J. (1994), in *Industrial Minerals and Rocks* (Littleton, Colo.: Society for Mining, Metallurgy, and Exploration); pp. 735–749.
Bregar, G. W. (1955), U.S. Pat. No. 2,701,240.
Brozek, M. et al. (1992), *Przegl. Gorn.*, Vol. 48, No. 7, pp. 16–20.
Cai, H. et al. (1992), *Kuangchan Zonghe Liyong.* (1992), No. 6, pp. 1–8.
Cain, C. W. Jr. (1984), in *Encyclopedia of Chemical Processing and Design* (New York: Marcel Dekker), pp. 348–372.
Carman, P. (1937), *Trans. Institution of Chem. Eng.*, pp. 150–166.
Codolini, L. (1953), Italian Patent 487,158.
Cummins, A. B. (1933), U.S. Pat. No. 1,934,410.
Dufour, P. (1990), French Patent 9,007,690.
Dufour, P. (1993), U.S. Pat. No. 5,179,062.
Engh, K. R. (1994), in *Kirk-Othmer Encyclopedia of Chemical Technology*, 4th ed., vol. 8 (New York: John Wiley & Sons); pp. 108–118.
Elsevier Advanced Technology (1992), *Handbook of Industrial Materials*, 2nd ed. (Oxford, England: Elsevier Science Publishers Ltd.), pp. 371–514.
Enzinger, K. (1901), U.S. Pat. No. 665,652.
Filho, F. X. H. et al. (1980), *Mineracá Metalurgia* Vol. 44, No. 424, pp. 14–21.
Geitgey, R. P., (1979) in *Industrial Minerals and Rocks* (Littleton, Colo.: Society for Mining, Metallurgy, and Exploration, Inc.), pp. 803–813.
Gordienko, V. F. (1941), Russian Patent 59,337.
Govindaraju, K. (July, 1989), *Geostandards Newsletter*, Vol. XIII.
Gruder, G. et al. (1958), *Rev. Chim. (Bucharest)*, Vol. 9, pp. 361–366.
Heertjes, P. et al. (1949), *Recueil*, Vol. 68, pp. 361–383.
Heertjes, P. et al. (1966) in *Solid-Liquid Separation* (London: Her Majesty's Stationery Office), pp. 37–43.
Hermanson, G. T. et al. (1992), *Immobilized Affinity Ligand Techniques* (San Diego: Academic Press Inc.).
Heyse, K. U. et al. (1980), *Brauwissenschaft*, Vol. 33, pp. 137–143.
Houston, H. H. (1959), U.S. Pat. No. 2,898,303.
Jones, F. R. (1992), U.S. Pat. No. 5,122,112.
Jung, J. (1965), Belgium Patent 657,019.
Kasama, K. and Ida, T. (1958), Japanese Patent 10,780.
Kiefer, J. (1991), *Brauwelt International*, IV/1991; pp. 300–309.
Kieselguhr-Industrie G.m.b.H. (1942), German Patent 730,034.
Klug, H. P., and Alexander, L. E. (1972), *X-Ray Diffraction Procedures for Polycrystalline and Amorphous Materials*, 2nd ed. (New York: John Wiley & Sons), pp. 531–563.
Koech, R. (1927), German Patent 469,606.
Kouloheris, A. P. (1971), U.S. Pat. No. 3,572,500.
Kujawa, R. J. (1983), in *Industrial Minerals and Rocks*, 5th ed. (Littleton, Colo.: Society for Mining, Metallurgy, and Exploration, Inc.), pp.199–201.
Li, F. (1990), *Feijinshukang*, Vol. 1989, No. 3, pp. 27–28 and 43.
Liang, C., et al. (1990), Chinese Patent 1,044,233.
Marcus, D. et al. (1964), *Rev. Chim. (Bucharest)*, Vol. 15, No. 11, pp. 671–674.
Marcus, D. (1967), *Rev. Chim. (Bucharest)*, Vol. 18, No. 6, pp. 332–335.
Martin, C. C. and Goodbue, D. T. (1968), U.S. Pat. No. 3,375,922.
Mitsui, Y., et al. (1989), Japanese Patent 01-153564.
Morisaki, K. and Watanabe, M. (1976), U.S. Pat. No. 3,944,687.
Munn, D. R. (1970), U.S. Pat. No. 3,547,260.
Nielsen, R. B. and Vogelsang, C. J. (1979), U.S. Pat. No. 4,142,968.
Nishimura, Y. (1958), Japanese Patent 4,414.
Nordèn, H., et al. (1994), *Separation Science and Technology*, Vol. 29, No. 10, pp. 1319–1334.
Norman, J., et al. (1940), *Mining Technology* May 1940, pp. 1–11.
Olmsted, Jr., B. C. (1982), U.S. Pat. No. 4,324,844.
Ostreicher, E. A. (1986), U.S. Pat. No. 4,617,128.
Pesce, L. (1955), Italian Patent 529,036.

Pesce, L. (1959), German Patent 1,052,964.
Reynolds, T. III (1976), in Wang, F., ed., *Treatise on Materials Science and Technology*, Vol. 9, pp. 199–216.
Rubin, I. (1990), *Handbook of Plastic Materials and Technology* (New York: John Wiley & Sons, Inc.).
Ruff, D. and Nath (1982), U.S. Pat. No. 4,313,997.
Ruth, B. (1946), *Industrial and Engineering Chemistry*, Vol. 38, No. 6, pp. 564–571.
Scholes, S. (1974), *Modern Glass Practice*, 7th ed. by C. Greene (Boston, Mass.: CBI Publishing Company, Inc.).
Schrauf, R. and Frey, A. (1957), German Patent 1,005,048.
Schuetz, C. C. (1935), U.S. Pat. No. 1,992,547.
Seymour, R. B. (1990), *Engineering Polymer Sourcebook* (New York: McGraw-Hill Publishing Company).
Shiuh, J. (1982), U.K. Patent 2,080,282A.
Shiuh, J. (1985), U.S. Pat. No. 4,557,883.
Smith, T. R. (1991a), U.S. Pat. No. 5,009,906.
Smith, T. R. (1991b), Canadian Patent 2,044,868.
Smith, T. R. (1991c), Danish Patent 9,101,179.
Smith, T. R. (1992a), German Patent 4,120,242.
Smith, T. R. (1992b), Dutch Patent 9,101,957.
Smith, T. R. (1992c), Brazilian Patent 9,102,509.
Smith, T. R. (1993), Australian Patent 638,655.
Smith, T. R. (1994a), U.K. Patent 2,245,265.
Smith, T. R. (1994b), Japanese Patent 6-315368.
Sperry, D. (1916), *Metallurgical and Chemical Eng.*, Vol. 15, No. 4, pp. 198–203.
Suzuki, T., and Tomizawa, T. (1971), Japanese Patent 46-7563.
Swallen, L. C. (1950), U.S. Pat. No. 2,504,347.
Tarhanic, L. et al. (1979), *Geol. Pruzkum* Vol. 21, No. 5, pp. 140–142.
Thomson, W. and Barr, J. (1907), U.K. Patent 5397.
Tiller, F. et al. (1953), *Chemical Engineering Progress*, Vol. 49, No. 9, pp. 467–479.
Tiller, F. et al. (1962), *A.I.Ch.E. Journal.*, Vol. 8, No. 4, pp. 445–449.
Tiller, F. et al. (1964), *A.I.Ch.E. Journal.*, Vol. 10, No. 1, pp. 61–67.
Vereiningte Deutsche Kieselguhrwerke G.m.b.H. (1915), German Patent 286,240.
Vereinigte Stahlwerke A.-G. (1931), U.K. Patent 341,060.
Videnov, N. et al. (1993), *Inter. J. Miner. Process.*, Vol. 39, pp. 291–298.
Visman, J., and Picard, J. L. (1972), Canadian Patent 890,249.
Wang, S. (1992), *Feijinshukang*, Vol. 1992, No. 3, pp. 10–13.
Williams, R. C. (1926), U.S. Pat. No. 1,606,281.
Xiao, S. (1986), Chinese Application 86-107500.
Zaklac Elektro Spolka z Organiczona Poreka (1933), German Patent 570,015.
Zhong, S., et al. (1991), Chinese Patent 1,053,564.
Analytica-EBC of the European Brewery Convention, 4th ed. (1987; Zurich: Braurei- und Getränke-Rundschau); pp. E255–E258.
Kansas Minerals, Inc. (undated publication), *KAMCO Filteraids, Fillers, Micro Silica Beads*.
American Society for Testing and Materials (1995), Method E 1545, Vol. 14.02, pp. 982–985.

We claim:

1. An advanced composite filtration media comprising heterogeneous media particles, each of said media particles comprising:
  (i) a diatomite component; and,
  (ii) an expanded perlite component;
  wherein said diatomite component is intimately and directly bound to said perlite component.

2. The advanced composite filtration media of claim 1,
  wherein the permeability of said media is greater than the permeability of a simple mixture of said diatomite component and said perlite component;
  wherein the proportions of said diatomite component and said perlite component in said simple mixture are identical to those used in the preparation of said media.

3. The advanced composite filtration media of claim 1,
  wherein the permeability of said media is greater than the permeability of a simple mixture of said diatomite component and said perlite component by 5% or more;
  wherein the proportions of said diatomite component and said perlite component in said simple mixture are identical to those used in the preparation of said media.

4. The advanced composite filtration media of claim 1,
  wherein the median particle diameter of said media is greater than the weighted average of:
    the median particle diameter of said diatomite component; and,
    the median particle diameter of said perlite component;
  wherein the proportions of said diatomite component and said perlite component are identical to those used in the preparation of said media.

5. The advanced composite filtration media of claim 1,
  wherein the median particle diameter of said media is greater than the weighted average of:
    the median particle diameter of said diatomite component; and,
    the median particle diameter of said perlite component by 5% or more;
  wherein the proportions of said diatomite component and said perlite component are identical to those used in the preparation of said media.

6. The advanced composite filtration media of claim 1, further characterized by a cristobalite content of 3% or less by weight.

7. The advanced composite filtration media of claim 1, further characterized by a cristobalite content of 1% or less by weight.

8. A composition comprising an advanced composite filtration media according to claim 1.

9. The composition of claim 8, wherein said composition is in the form of a powder.

10. The composition of claim 8, wherein said composition is in the form of a sheet, pad, or cartridge.

11. The composition of claim 8, wherein said composition is in the form of a monolithic support or an aggregate support.

12. The composition of claim 8, wherein said composition is in the form of a monolithic substrate or an aggregate substrate.

13. A method of filtration comprising the step of passing a fluid containing suspended particulates through a filter aid material supported on a septum, wherein said filter aid material comprises an advanced composite filtration media according to claim 1.

14. The advanced composite filtration media of claim 1 wherein said diatomite component is thermally sintered to said expanded perlite component.

15. An advanced composite filtration media comprising heterogeneous media particles, each of said media particles comprising:
  (i) a diatomite component; and,
  (ii) a thermoplastic or thermoset polymer exhibiting thermoplastic behavior component;
  wherein said diatomite component is intimately and directly bound to said thermoplastic or thermoset polymer component.

16. The advanced composite filtration media of claim 15,
wherein the permeability of said media is greater than the permeability of a simple mixture of said diatomite component and said thermoplastic or thermoset polymer component;
wherein the proportions of said diatomite component and said thermoplastic or thermoset polymer component in said simple mixture are identical to those used in the preparation of said media.

17. The advanced composite filtration media of claim 15,
wherein the permeability of said media is greater than the permeability of a simple mixture of said diatomite component and said thermoplastic or thermoset polymer component by 5% or more;
wherein the proportions of said diatomite component and said thermoplastic or thermoset polymer component in said simple mixture are identical to those used in the preparation of said media.

18. The advanced composite filtration media of claim 15,
wherein the median particle diameter of said media is greater than the weighted average of:
the median particle diameter of said diatomite component; and,
the median particle diameter of said thermoplastic or thermoset polymer component;
wherein the proportions of said diatomite component and said thermoplastic or thermoset polymer component are identical to those used in the preparation of said media.

19. The advanced composite filtration media of claim 15,
wherein the median particle diameter of said media is greater than the weighted average of:
the median particle diameter of said diatomite component; and,
the median particle diameter of said thermoplastic or thermoset polymer component by 5% or more;
wherein the proportions of said diatomite component and said thermoplastic or thermoset polymer component are identical to those used in the preparation of said media.

20. The advanced composite filtration media of claim 15, further characterized by a cristobalite content of 3% or less by weight.

21. The advanced composite filtration media of claim 15, further characterized by a cristobalite content of 1% or less by weight.

22. A composition comprising an advanced composite filtration media according to claim 15.

23. The composition of claim 22, wherein said composition is in the form of a powder.

24. The composition of claim 22, wherein said composition is in the form of a sheet, pad, or cartridge.

25. The composition of claim 22, wherein said composition is in the form of a monolithic support or an aggregate support.

26. The composition of claim 22, wherein said composition is in the form of a monolithic substrate or an aggregate substrate.

27. A method of filtration comprising the step of passing a fluid containing suspended particulates through a filter aid material supported on a septum, wherein said filter aid material comprises an advanced composite filtration media according to claim 15.

28. The advanced composite filtration media of claim 15 wherein said diatomite component is thermally sintered to said thermoplastic or thermoset polymer component.

29. An advanced composite filtration media comprising heterogeneous media particles, each of said media particles comprising:
(i) a diatomite component; and,
(ii) a fiber glass component;
wherein said diatomite component is intimately and directly bound to said fiber glass component.

30. The advanced composite filtration media of claim 29,
wherein the permeability of said media is greater than the permeability of a simple mixture of said diatomite component and said fiber glass component;
wherein the proportions of said diatomite component and said fiber glass component in said simple mixture are identical to those used in the preparation of said media.

31. The advanced composite filtration media of claim 29,
wherein the permeability of said media is greater than the permeability of a simple mixture of said diatomite component and said fiber glass component by 5% or more;
wherein the proportions of said diatomite component and said fiber glass component in said simple mixture are identical to those used in the preparation of said media.

32. The advanced composite filtration media of claim 29,
wherein the median particle diameter of said media is greater than the weighted average of:
the median particle diameter of said diatomite component; and,
the median particle diameter of said fiber glass component;
wherein the proportions of said diatomite component and said fiber glass component are identical to those used in the preparation of said media.

33. The advanced composite filtration media of claim 29,
wherein the median particle diameter of said media is greater than the weighted average of:
the median particle diameter of said diatomite component; and,
the median particle diameter of said fiber glass component by 5% or more;
wherein the proportions of said diatomite component and said perlite component are identical to those used in the preparation of said media.

34. The advanced composite filtration media of claim 29, further characterized by a cristobalite content of 3% or less by weight.

35. The advanced composite filtration media of claim 29, further characterized by a cristobalite content of 1% or less by weight.

36. A composition comprising an advanced composite filtration media according to claim 29.

37. The composition of claim 36, wherein said composition is in the form of a powder.

38. The composition of claim 36, wherein said composition is in the form of a sheet, pad, or cartridge.

39. The composition of claim 36, wherein said composition is in the form of a monolithic support or an aggregate support.

40. The composition of claim 36, wherein said composition is in the form of a monolithic substrate or an aggregate substrate.

41. A method of filtration comprising the step of passing a fluid containing suspended particulates through a filter aid material supported on a septum, wherein said filter aid material comprises an advanced composite filtration media according to claim 29.

42. The advanced composite filtration media of claim 29 wherein said diatomite component is thermally sintered to said fiber glass container.

43. An advanced composite filtration media comprising heterogeneous media particles, each of said media particles comprising:
   (i) a functional filtration component selected from the group consisting of diatomite, expanded perlite, pumice, obsidian, pitchstone, and volcanic ash; and,
   (ii) a matrix component;
   wherein said matrix component has a softening point temperature less than the softening point temperature of said functional filtration component; and,
   wherein said functional filtration component is intimately and directly bound to said matrix component.

44. The advanced composite filtration media of claim 43, wherein said functional filtration component is selected from the group consisting of diatomite, expanded perlite, and volcanic ash.

45. The advanced composite filtration media of claim 43, wherein said functional filtration component is diatomite.

46. The advanced composite filtration media of claim 43 wherein said functional filtration component is thermally sintered to said matrix component.

47. An advanced composite filtration media comprising heterogeneous media particles, each of said media particles comprising:
   (i) a functional filtration component; and
   (ii) a natural glass;
   wherein said natural glass has a softening point temperature less than the softening point temperature of said functional filtration component; and,
   wherein said functional filtration component is intimately and directly bound to said natural glass.

48. The advanced composite filtration media of claim 47 wherein said functional filtration component is thermally sintered to said natural glass.

49. An advanced composite filtration media comprising heterogeneous media particles, each of said media particles comprising:
   (i) a functional filtration component; and
   (ii) expanded perlite, pumice, obsidian, pitchstone, or volcanic ash;
   wherein said perlite, pumice, obsidian, pitchstone, or volcanic ash has a softening point temperature less than the softening point temperature of said functional filtration component; and,
   wherein said functional filtration component is intimately and directly bound to said perlite, pumice, obsidian, pitchstone, or volcanic ash.

50. The advanced composite filtration media of claim 49 wherein said functional filtration component is thermally sintered to said expanded perlite, pumice, obsidian, pitchstone or volcanic ash.

51. An advanced composite filtration media comprising heterogeneous media particles, each of said media particles comprising:
   (i) a functional filtration component; and
   (ii) expanded perlite;
   wherein said perlite has a softening point temperature less than the softening point temperature of said functional filtration component; and,
   wherein said functional filtration component is intimately and directly bound to said perlite.

52. The advanced composite filtration media of claim 51 wherein said functional filtration component is thermally sintered to said expanded perlite.

53. An advanced composite filtration media comprising heterogeneous media particles, each of said media particles comprising:
   (i) a functional filtration component; and
   (ii) fluxed expanded perlite;
   wherein said fluxed expanded perlite has a softening point temperature less than the softening point temperature of said functional filtration component; and,
   wherein said functional filtration component is intimately and directly bound to said fluxed perlite.

54. The advanced composite filtration media of claim 53 wherein said functional filtration component is thermally sintered to said fluxed perlite.

55. An advanced composite filtration media comprising heterogeneous media particles, each of said media particles comprising:
   (I) a functional filtration component selected from the group consisting of diatomite, expanded perlite, pumice, obsidian, pitchstone, and volcanic ash; and
   (ii) a metal or metal alloy;
   wherein said metal or metal alloy has a softening point temperature less than the softening point temperature of said functional filtration component; and,
   wherein said functional filtration component is intimately and directly ground to said metal or metal alloy.

56. The advanced composite filtration media of claim 55 wherein said functional filtration component is thermally sintered to said metal or metal alloy.

* * * * *

UNITED STATES PATENT AND TRADEMARK OFFICE
CERTIFICATE OF CORRECTION

PATENT NO. : 5,776,353

DATED : July 7, 1998

INVENTOR(S) : Scott K. Palm *et al.*

It is certified that error appears in the above-identified patent and that said Letters Patent is hereby corrected as shown below:

Cover page, 1st column, in section [56] References Cited, under heading "U.S. PATENT DOCUMENTS," please insert the following references:

| | | |
|---|---|---|
| 665,652 | 01/1901 | Enzinger |
| 1,606,281 | 11/1926 | Williams |
| 1,934,410 | 11/1933 | Cummins |
| 1,992,547 | 02/1935 | Schuetz |
| 2,504,357 | 04/1950 | Swallen |
| 2,701,240 | 02/1955 | Bregar |
| 2,898,303 | 08/1959 | Houston |
| 2,956,016 | 10/1960 | Leppla |
| 2,967,149 | 01/1961 | McCollum et al. |
| 3,375,922 | 04/1968 | Martin et al. |
| 3,547,260 | 12/1970 | Munn |
| 3,572,500 | 03/1971 | Kouloheris |
| 3,944,687 | 03/1976 | Morisaki et al. |
| 4,064,071 | 12/1977 | Gilmour et al. |
| 4,134,857 | 01/1979 | Bradley et al. |
| 4,142,968 | 03/1979 | Nielsen et al. |
| 4,313,997 | 02/1982 | Ruff et al. |
| 4,325,844 | 04/1982 | Olmsted, Jr. |
| 4,557,883 | 12/1985 | Shiuh et al. |
| 4,617,128 | 10/1986 | Ostreicher |
| 4,737,411 | 04/1988 | Graves, Jr. et al. |
| 5,009,906 | 04/1991 | Smith |
| 5,122,112 | 06/1992 | Jones |
| 5,179,062 | 01/1993 | Dufour |

UNITED STATES PATENT AND TRADEMARK OFFICE
CERTIFICATE OF CORRECTION

PATENT NO. : 5,776,353

DATED : July 7, 1998

INVENTOR(S) : Scott K. Palm *et al.*

It is certified that error appears in the above-identified patent and that said Letters Patent is hereby corrected as shown below:

Cover page, 2nd column, in section [56] References Cited, under heading " FOREIGN PATENT DOCUMENTS," please insert the following references:

| | | |
|---|---|---|
| 657019 | 06/1965 | Belgium |
| 890249 | 01/1972 | Canada |
| 128699 | 08/1968 | Czechoslovakia |
| 128894 | 08/1968 | Czechoslovakia |
| 77086 | 08/1907 | France |
| 268553 | 11/1975 | France |
| 484861 | 12/1981 | France |
| 663564 | 12/1991 | France |
| 70015 | 02/1933 | Germany |
| 30034 | 01/1943 | Germany |
| 005048 | 03/1957 | Germany |
| 440931 | 05/1995 | Germany |
| 3-10780 | 12/1958 | Japan |
| 9337 | 03/1941 | Russia |
| 379 | 10/1907 | United Kingdom |
| 41060 | 01/1931 | United Kingdom |

UNITED STATES PATENT AND TRADEMARK OFFICE
CERTIFICATE OF CORRECTION

PATENT NO. : 5,776,353

DATED : July 7, 1998

INVENTOR(S) : Scott K. Palm et al.

Page 3 of 10

It is certified that error appears in the above-identified patent and that said Letters Patent is hereby corrected as shown below:

Cover page, 2nd column, in section [56] References Cited, following the section "FOREIGN PATENT DOCUMENTS" and before the line "Primary Examiner - Ana Fortuna," please insert the following heading and references:

OTHER PUBLICATIONS

"Analytica-EBC," European Brewery Convention, 4th ed., (1987) Braurei-und Getranke-Rundschau, Zurich, pp. E255-E258.

"Standard test method for glass transition temperatures by thermomechanical analysis," in 1995 Annual Book of ASTM Standard, American Society for Testing and Materials (1995), Method E 1545-95, Vol. 14.02, pp. 982-985.

Akira et al., "Production of Inorganic Porous Material," JAPIO Abstract and Derwents Abstract for Japanese Patent Publication No. JP 3-215373, published September 20, 1991.

Baly et al., "The adsorption of the hydrous metallic oxides by kieselguhr," Trans. Farady Soc. (1939) 35:1165-1175.

Bear, "Chapter 5: The equation of motion of a homogeneous fluid," in Dynamics of Fluids in Porous Media (1988) Dover Publications, Inc., New York, pp. 119-194.

Berry et al., eds., excerpt from "Appendix A - Natural glasses and macerals," in Mineralogy, 2nd ed. (1983) Freeman and Co., New York, pp. 540-542.

Breese, "Diatomite," in Industrial Minerals and Rocks, 6th Ed., (1994), pub. by Soc. for Mining, Metallurgy, and Exploration, Inc., Littleton, CO, pp. 397-412.

UNITED STATES PATENT AND TRADEMARK OFFICE
CERTIFICATE OF CORRECTION

PATENT NO. : 5,776,353

DATED : July 7, 1998

INVENTOR(S) : Scott K. Palm *et al.*

Page 4 of 10

It is certified that error appears in the above-identified patent and that said Letters Patent is hereby corrected as shown below:

Breese, "Perlite," in *Industrial Minerals and Rocks, 6th Ed.*, (1994), Society for Mining, Metallurgy, and Exploration, Inc., Littleton, CO, pp. 735-749.

Brozek et al., "Enrichment of Carpathian diatomities by the flotation-chemical method," *Przeglad Gorniczy* (1992) 7:16-20. (English translation from Polish) pp. 1-20.

Cai et al., *Chemical Abstracts* (1994) 120:110820, for *Kuangchan Zonghe Liyong* (1992) 6:1-8.

Cain, Jr., "Filter aid, use in filtration," in *Encyclopedia of Chemical Processing and Design* (1984) Marcel Dekker, Inc., New York, Chapter 21, pp. 348-372.

Carman, "Fluid flow through granular beds," *Trans-Institution of Chem. Eng.* (1937) pp. 150-166.

Codolini, "Bleaching kieselguhr for paper manufacture," *Chemical Abstracts* (1956) 50:11669f for Italian Patent No. 487,158 published November 23, 1953.

Engh, "Diatomite," in *Kirk-Othmer Encyclopedia of Chemical Technology*, 4th Ed., John Wiley & Sons, Inc., New York. 8:108-118.

Filho et al., "Processing of diatomite from canavieira in the State of Ceará," in *Mineracao Metalurgia*, pp. 14-21, (Translation from Portuguese) pp. 1-23.

UNITED STATES PATENT AND TRADEMARK OFFICE
CERTIFICATE OF CORRECTION

PATENT NO. : 5,776,353
DATED : July 7, 1998
INVENTOR(S) : Scott K. Palm et al.

It is certified that error appears in the above-identified patent and that said Letters Patent is hereby corrected as shown below:

Geitgey, "Pumice and Volcanic Cinder," in Industrial Minerals and Rocks, 6th Ed., (1994), Society for Mining, Metallurgy, and Exploration, Inc., Littleton, CO, pp. 803-813.

Govindaraju, "1989 Compilation of working values and sample description for 272 geostandards," Geostandards Newsletter (1989) Volume XIII, pp. 1-8, excerpts from Appendices I, III, and IV.

Gruder et al., "Beneficiation of some natural materials by the electrochemical method. Communication I. Diatomites and kaolins," Rev. Chim. (Bucharest) (1958) 9:361-366 with English translation from Romanian, pp. 1-30.

Heertjes et al., "Chapter 2: Filter blocking, filter media and filter aids," in Solid-Liquid Separation (1966) London, Her Majesty's Stationery Office, pp. 37-43.

Heertjes et al., "Studies in filtration. Part 1," in Recueil (1949) 68:361-383.

Hermanson et al., "Controlled Pore Glass and Silica," in Immobilized Affinity Ligand Techniques, Academic Press, Inc., San Diego, CA pp. 11-14.

Kiefer, "Kieselguhr filtration," in Brauwelt International (1991), IV, pp. 300-309.

UNITED STATES PATENT AND TRADEMARK OFFICE
CERTIFICATE OF CORRECTION

PATENT NO. : 5,776,353
DATED : July 7, 1998
INVENTOR(S) : Scott K. Palm et al.

It is certified that error appears in the above-identified patent and that said Letters Patent is hereby corrected as shown below:

Klug et al., X-ray Diffraction Procedures for Polycrystalline and Amorphous Materials, 2nd ed., (1974) John Wiley & Sons, New York, pp. 531-563.

Koech, "Treating kieselguhr," Chemical Abstracts (1929) 23:1729 for German Patent No. 469,606 published February 15, 1927.

Kujawa, "Construction materials. Insulating materials-thermal and sound," in Industrial Minerals and Rocks 5th ed., (1983) 1:199-201.

Li, "Study of keiselguhr purification by acid processing," Chemical Abstracts (1990) 112:182335z for Feijinshukuan (1989) 3:27-28, 43.

Liang et al., "Preparation of filter aids from diatomite," Chemical Abstracts (1992) 116:86932d for Chinese Patent No. 1,044,233 published August 1, 1990.

Marcus et al., "Obtaining higher grades of diatomite for filtering and filling," in Rev. Chim. (Bucharest) (1964) 15(11):671-674. (English translation from Romanian) pp. 1-21.

Marcus, "Studies on the deferrization of some diatomites and the quality of the products obtained," in Rev. Chim. (Bucharest) (1967) 18:332-335. (English translation from Romanian) pp. 1-18.

Masayasu et al., "Ceramic Sheet and Manufacture," JAPIO Abstract and Derwents Abstract for Japanese Patent Publication No. JP 60-137874, published July 22, 1985.

Mitsui et al., "White kieselguhr and its manufacture," Chemical Abstracts (1990) 112:39218h for Japanese Patent Publication No. 01-153,564 published June 15, 1989.

UNITED STATES PATENT AND TRADEMARK OFFICE
CERTIFICATE OF CORRECTION

PATENT NO. : 5,776,353
DATED : July 7, 1998
INVENTOR(S) : Scott K. Palm et al.

It is certified that error appears in the above-identified patent and that said Letters Patent is hereby corrected as shown below:

Nishimura, " Decolorization of diatomaceous earth," Chemical Abstracts (1959), 53:15427i for Japanese Patent No. 4414 published June 5, 1958.

Nordén et al., " Application of volume balances and the differential diffusion equation to filtration," in Separation Science and Technology (1994) 29(10):1319-1334.

Norman et al., " Purification of diatomite by froth flotation," in Mining Technology (May 1940) pp. 1-11.

Okamoto et al., " Removal of iron impurity from siliciou materials," Chemical Abstracts (1987) 107:136943v for Japanese Patent Publication No. 62-132722 published June 16, 1987.

Pesce, " Bleaching of diatomaceous earth," Chemical Abstracts (1961) 55:2954e for German Patent No. 1,052,964 published March 19, 1959.

Pesce, " Bleaching of kieselguhr," Chemical Abstracts (1958) 52:15007h for Italian Patent No. 529,036 published June 18, 1955.

Reynolds III, " Firing," in Treatise on Materials Science and Technology, Volume 9, Ceramic Fabrication Process, (1976) 9:199-215.

Rubin, ed., Handbook of Plastic Materials and Technology, John Wiley & Sons, New York, 1990.

Ruth, " Correlating filtration theory with industrial practice," in Industrial and Engineering Chemistry (June 1946) 38: 564-571.

UNITED STATES PATENT AND TRADEMARK OFFICE
CERTIFICATE OF CORRECTION

PATENT NO. : 5,776,353
DATED : July 7, 1998
INVENTOR(S) : Scott K. Palm et al.

It is certified that error appears in the above-identified patent and that said Letters Patent is hereby corrected as shown below:

Scholes, Modern Glass Practice, 7th ed., (1974), revised by C.H. Greene, CBI Publishing Co. Inc., Boston, MA.

Suzuki et al., " Removal of iron compounds from inorganic materials," Chemical Abstracts (1971) 75:143572x for Japanese Patent Publication No. 71-07563 published February 25, 1971.

Tarhanic et al., " Enrichment of diatomite from the Mociar deposit in heavy suspensions," Chemical Abstracts (1979) 91:76255m for Geol. Pruzkum (1979) 21(5):140-142.

Tiller et al., " The role of porosity in filtration. Part VI. New definition of filtration resistance," A.I.Ch.E. Journal (January 1964) 10:61-67.

Tiller et al., " The role of porosity in filtration: Part V. Porosity variation in filter cakes," A.I.Ch.E. Journal (September 1962) 8:445-449.

Tiller, " The role of porosity in filtration. Numerical methods for constant rate and constant pressure filtration based on Kozeny's law," Chemical Engineering Progress (September 1953) 49:467-479.

UNITED STATES PATENT AND TRADEMARK OFFICE
CERTIFICATE OF CORRECTION

PATENT NO. : 5,776,353
DATED : July 7, 1998
INVENTOR(S) : Scott K. Palm et al.

It is certified that error appears in the above-identified patent and that said Letters Patent is hereby corrected as shown below:

Vereinigte Deutsche Kieselgurwerke G.M.B.H., "Removing iron from kieselguhr by treatment with acid," Chemical Abstracts (1916) 10:1085 for German Patent No. 286,240 published December 9, 1913.

Videnov et al., "Beneficiation of diatomites by high gradient magnetic separation," Intnl. J. Miner. Processing (1993) 39:291-298.

Wang, "Comprehensive utilization of lake diatomite and study on its thermal flotation technique," English translation of abstract for article in Feijinshukuan (1992), Vol. 3.

Xiao, "Using low quality diatomaceoues earth to prepare purified and calcine matetrials with higher activities for multiple applications," English translation of abstract for Chinese Patent Application No. CN 86-1-07500 A and Chinese Patent Abstract for Chinese Patent Application No. CN 86-1-07500 A.

Yuzuru et al., "Filter Element for De-Oiler," JAPIO Abstract and Derwents Patent Abstract for Japanese Patent Publication No. JP 53-090065, published August 8, 1978.

Zhong et al., "Dry gravitational stratification apparatus for separating and refining diatomite," Chemical Abstracts (1992) 116:108933j for Chinese Patent No. 1,053,564 published August 7, 1991.

UNITED STATES PATENT AND TRADEMARK OFFICE
CERTIFICATE OF CORRECTION

PATENT NO. : 5,776,353
DATED : July 7, 1998
INVENTOR(S) : Scott K. Palm et al.

It is certified that error appears in the above-identified patent and that said Letters Patent is hereby corrected as shown below:

Column 6, line 12, " salt i.e., sodium" should read
- - salt (i.e., sodium - -

Column 6, line 14, " metals i.e., Group" should read
- - metals (i.e., Group - -

Column 19, line 32, " tine are retained" should read
- - tin are retained - -

Claim 42, line 3, " fiber glass container" should read
- - fiber glass component - -

Signed and Sealed this

Second Day of January, 2001

Attest:

Attesting Officer

Q. TODD DICKINSON

Commissioner of Patents and Trademarks